United States Patent [19]
Churchill

[11] Patent Number: 5,536,976
[45] Date of Patent: Jul. 16, 1996

[54] MULTIPLE SERVICE LOAD SOLID STATE SWITCHING FOR CONTROLLED COGENERATION SYSTEM

[75] Inventor: Jonathan D. Churchill, Sheboygan, Wis.

[73] Assignee: Gas Research Institute, Chicago, Ill.

[21] Appl. No.: 205,272

[22] Filed: Mar. 3, 1994

[51] Int. Cl.[6] ................................................. H02J 3/04
[52] U.S. Cl. ............................. 307/11; 307/29; 307/38; 307/40; 364/492; 290/4 A; 290/4 R; 363/1
[58] Field of Search ....................... 307/11, 29, 38, 307/40, 21; 364/492; 323/220; 290/4, 4 A, 4 R; 363/1

[56] References Cited

U.S. PATENT DOCUMENTS

| | | |
|---|---|---|
| 1,714,938 | 5/1929 | Bear . |
| 2,655,602 | 10/1953 | Kuhn .............................. 290/4 |
| 3,665,212 | 5/1972 | Roberts et al. ..................... 367/252 |
| 3,678,284 | 7/1972 | Peters ............................... 290/1 |
| 3,946,242 | 3/1976 | Wilkerson .......................... 367/45 |
| 4,131,827 | 12/1978 | Larrabee ............................ 307/46 |
| 4,205,235 | 5/1980 | Pal et al. ........................... 290/44 |
| 4,262,209 | 4/1981 | Berner ............................. 290/7 |
| 4,262,212 | 4/1981 | Jacob et al. ........................ 307/9 |
| 4,289,954 | 9/1981 | Brognano et al. .................... 219/307 |
| 4,403,292 | 9/1983 | Ejzak et al. ....................... 364/492 |
| 4,427,897 | 1/1984 | Migliori ........................... 290/44 |
| 4,438,340 | 3/1984 | Armiger ........................... 290/2 |
| 4,510,756 | 4/1985 | Hise et al. ......................... 60/659 |
| 4,511,807 | 4/1985 | Somerville ........................ 307/46 |
| 4,607,323 | 8/1986 | Sokal et al. ....................... 363/97 |
| 4,657,290 | 4/1987 | Linden ............................ 290/2 |
| 4,685,041 | 8/1987 | Bowman et al. ..................... 363/40 |
| 4,686,375 | 8/1987 | Gottfried .......................... 290/2 |
| 4,694,383 | 9/1987 | Nguyen et al. ..................... 363/17 |
| 4,703,191 | 10/1987 | Ferguson .......................... 307/64 |
| 4,715,192 | 12/1987 | Katz .............................. 62/323 |
| 4,719,559 | 1/1988 | Sokal et al. ....................... 363/98 |
| 4,731,547 | 3/1988 | Alenduff et al. .................... 307/85 |
| 4,752,697 | 6/1988 | Lyons et al. ...................... 290/2 |
| 4,758,940 | 7/1988 | Steigerwald ....................... 363/98 |
| 4,774,649 | 9/1988 | Archer ............................ 363/20 |
| 4,788,634 | 11/1988 | Schlecht et al. .................... 363/21 |
| 4,802,100 | 1/1989 | Assen et al. ....................... 364/494 |
| 4,814,962 | 3/1989 | Magalhaes et al. .................. 363/16 |
| 4,845,605 | 7/1989 | Steigerwald ....................... 363/21 |
| 4,879,624 | 11/1989 | Jones et al. ....................... 290/44 |
| 4,916,329 | 4/1990 | Dang et al. ....................... 307/66 |
| 5,012,121 | 4/1991 | Hammond et al. ................... 307/64 |
| 5,070,251 | 12/1991 | Rhodes et al. ..................... 361/65 |
| 5,349,699 | 6/1994 | Erben et al. ...................... 455/186.1 |
| 5,384,490 | 1/1995 | Swartz ............................ 307/38 |

Primary Examiner—Jonathan Wysocki
Assistant Examiner—Albert W. Paladini
Attorney, Agent, or Firm—Speckman, Pauley & Fejer

[57] ABSTRACT

An electrical generation system and method for switching a plurality of isolated circuits between a generator and an electrical source. A current signal of each isolated circuit is sensed and the current signal is emitted to a computer. A generator output signal is sensed and emitted to the computer. An available power signal of the electrical source is sensed and also emitted to the computer. The computer or a microprocessor computes, as a function of the sensed load signals, a sensed generator output signal, and the sensed available power signal, whether each solid state load switch should be individually switched to connect each corresponding isolated circuit to either the generator or the electrical source. The computer or microprocessor then emits a switching signal to each solid state load switch for electrically connecting each corresponding isolated circuit to either the generator or the electrical source.

12 Claims, 2 Drawing Sheets

MULTIPLE SERVICE LOAD SOLID STATE SWITCHING FOR CONTROLLED COGENERATION SYSTEM

BACKGROUND OF THE INVENTION

1. Field of the Invention

The present invention relates to cogeneration with effective utilization of thermal and electrical energy. More particularly, this invention is concerned with utilization of cogenerated electrical energy in residential, commercial and possibly industrial applications each having multiple service loads wherein individual electrical service loads are switched between utility grid and cogeneration sources by solid state switching controlling the electrical demand on the cogeneration source.

2. Description of Prior Art

Solid state load switches which operate at the time the voltage waveform passes through zero and zero crossing detectors are known to the art, as exemplified by U.S. Pat. Nos. 5,070,251; 4,879,624; 4,703,191; 4,427,897; and 3,665,212. U.S. Pat. No. 5,012,121 teaches a solid state under voltage switch to supply high amounts of electrical energy for brief periods, 100 ms, from a capacitor to a load. U.S. Pat. No. 4,262,212 teaches a control circuit responsive to load demands for transfer of power supplied to a recreational vehicle between land line, motor generator and invertor.

Auxiliary and standby power generators and methods of their operation, control and switching is taught by a wide variety of patents of which the following are exemplary. Computer controlled synchronization and switching of standby battery sources for replacement of power in AC line upon failure is taught by U.S. Pat. No. 5,070,251. U.S. Pat. No. 4,916,329 teaches an uninterruptible power supply having a series of regulator switches to maintain load output voltage within limits during variations in AC input voltage by supply of power through a transformer. A plurality of generators for operation under peak loads of a primary and secondary load system while a single generator operates under low load conditions when the secondary load system is switched off is taught by U.S. Pat. No. 2,655,602. U.S. Pat. No. 1,714,938 teaches two generators, the second operable upon need demand and switching equipment therefore. Auxiliary power generators to reduce peak electrical demand on an electrical distribution network by operating at a preset demand point with at least one secondary generator in parallel with the electric utility system is taught by U.S. Pat. No. 4,731,547. Solar cell operation of a DC motor to drive an AC motor-generator to reduce power drawn from and to return power to an AC utility line is taught by U.S. Pat. No. 4,131,827.

Generation of electrical power by windmills wherein the generated power is a function of the wind velocity is generally known. To match the electrical load to the wind generator, U.S. Pat. No. 4,205,235 teaches switching five different loads to a wind generator output, each load corresponding to a range of speeds of the wind driven generator's rotor. U.S. Pat. No. 4,511,807 teaches maintenance of relatively constant electrical output frequency of a wind generator with changes in wind velocity by sensing frequency of the output and switching the load by solid state zero crossing relays between domestic resistive heaters and dump resistors which act as a governor, tending to limit the maximum speed of rotation of the wind turbine.

Residential cogeneration units utilizing thermal and electrical output are exemplified by the following references. U.S. Pat. No. 4,262,209 teaches an internal combustion engine driving an externally excited commutator AC motor-generator to provide AC power at a magnitude which is a function of the drive shaft velocity and degree of excitation to provide supplemental power to meet load requirements with engine heat being used for household uses. Residential cogeneration using peak time statistical analysis to predetermine transfer of a single household electrical load from an electric utility source to the cogeneration source by a single transfer switch is taught by U.S. Pat. No. 3,678,284. U.S. Pat. No. 4,752,697 teaches a cogeneration system having a plurality of cogenerators in which one unit is varied to regulate output and others are full on or full off to provide desired electrical output. Microprocessor-based control of cogeneration systems by selection of thermal or electrical load following modes and tailoring for economic considerations, performance characteristics, and cogenerator operating constraints providing electrical power which may be switched between a single load or the power grid is taught by U.S. Pat. No. 4,802,100. U.S. Pat. No. 4,510,756 teaches cogeneration controlled by a signal from the utility for supplying electricity to a residential service box and having centralized high and low grade heat storage for supply to multiple residences. The utilization of cogeneration systems in parallel with the utility grid to feed excess electricity into the utility grid is taught by the following U.S. Patents. U.S. Pat. No. 4,715,192 teaches an open cycle air conditioning unit in combination with a cogenerator which is thermally or electrically controlled based upon the need of the entire facility. U.S. Pat. No. 4,686,375 teaches a cogeneration system having two electrically isolated generators connected to a common shaft, one for supply to a facility for electrical consumption and a second for supply to a utility grid. U.S. Pat. No. 4,438,340 teaches a domestic cogenerator which feeds power into an entire building and when voltage output reaches 220 volts disconnects or feeds excess power into the utility grid.

SUMMARY OF THE INVENTION

It is an object of this invention to provide a residential or small commercial cogeneration system and process which furnishes heat and electric power to the residence independently of the utility electrical grid supply.

It is another object of this invention to provide a cogeneration system and process which may be used in a mode to supply stand-by electrical power to selected individual circuits in a residence or commercial site.

Another object of this invention is to provide a cogeneration system and process wherein the electrical output is controlled by demand of a plurality of individual household or commercial circuits.

Yet another object of this invention is to provide a cogeneration system and process wherein a plurality of solid state load switches switch individual service loads of household or commercial circuits between cogeneration and electric utility grid sources dependent upon the sensed demand of each individual service load circuit, and the overall load on the cogeneration source.

We have found that a most common economic disadvantage of conventional residential or relatively small commercial cogeneration equipment which sells power back to the utility when not required by the residence or industry has been in the utility paralleling subsystems which provide synchronization and paralleling necessary to operate the cogenerator in parallel with the utility. The cogeneration system and process of this invention does not operate in parallel with the utility grid at any time and thus the requirements and costs for such interconnection do not apply.

The thermal-electric cogeneration system of this invention has an internal combustion engine driven generator feeding a residential/commercial electrical load having a plurality of individual circuits. The system has an electrical distribution means with a plurality of solid state load switches, each such load switch capable of switching each of the individual circuits between the generator and the utility power grid without paralleling so that at no time is there a connection between the electrical output of the generator and the utility power grid. A microprocessor control system provides electrical load sensing of the electrical load on each of the individual circuits and according to predetermined criteria regulates switching individual circuits between the generator and the utility power grid. The microprocessor control system can also be used to control the load on the generator so that the load does not exceed a predetermined overload point.

The cogeneration system of this invention can also be used to provide stand-by power upon sensing failure of supply of power from the utility power grid. Upon loss of utility power critical circuits are switched to the generator provided they do not exceed the generator capacity.

Thermal energy output derived by generator engine coolant and/or exhaust may be used for building heating, domestic hot water heating, spa/pool heating, open cycle air conditioning, and other heat requirements which may be augmented by electrical heat utilizing electrical energy from the cogenerator.

DESCRIPTION OF PREFERRED EMBODIMENTS

A number of residences were monitored to obtain data for electricity consumption and current transients for typical residential motors. It was found that electrical load exceeds 5 KW for 2 percent of the day and was about 2 KW and greater for about 45 percent of the day. Thus with efficient operation of a 5 KW generator of a cogeneration system occurring between 2 and 5 KW, the system would operate for 45 percent of a 24 hour day. Sizing of a suitable cogeneration system can be done in a similar manner for a wide variety of residential and commercial applications.

One problem with acceptance of residential cogeneration systems has been the lack of effective utilization of heat in warm climates or during the summer months. The utilization of heat from a cogeneration system is important in the economic advantage of the system, heat utilization reducing the effective cost of natural gas fuel for the generator by more than 50 percent compared with dumping the heat. However, current advances in open cycle air conditioning systems which require heat in a desiccant dehumidification process offer excellent potential for usage of cogeneration heat. Economic advantage of the cogeneration system of this invention is enhanced by: high residential purchase electrical rates; high electrical consumption; low natural gas rates or special rates for cogeneration; high heating loads; and need for stand-by power.

Figure 1:
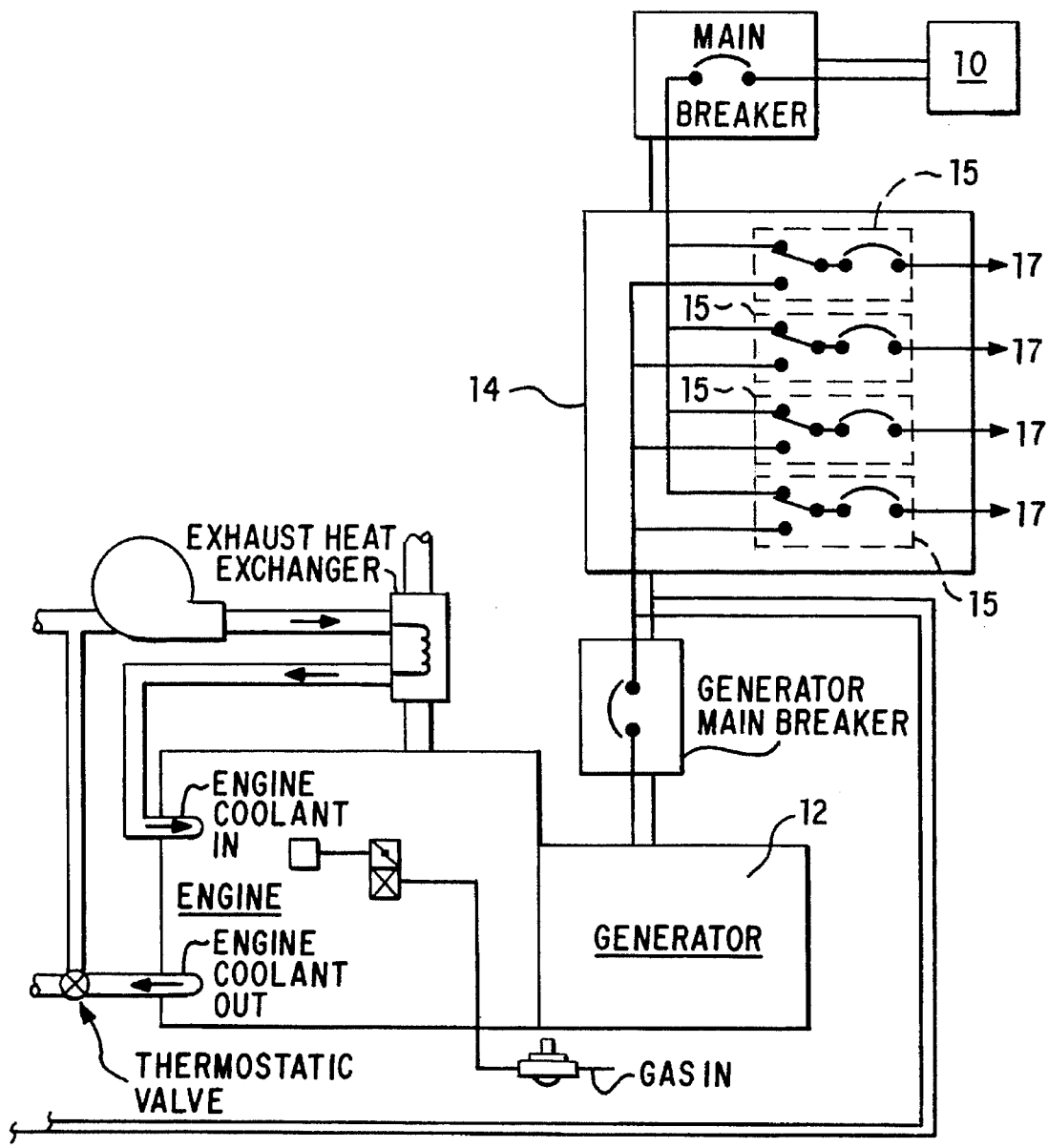
FIG. 1 is a simplified schematic diagram of one embodiment of a cogeneration system according to this invention utilizing a plurality of solid state load switches for switching individual service loads between a generator and a utility grid.
Figure 2:
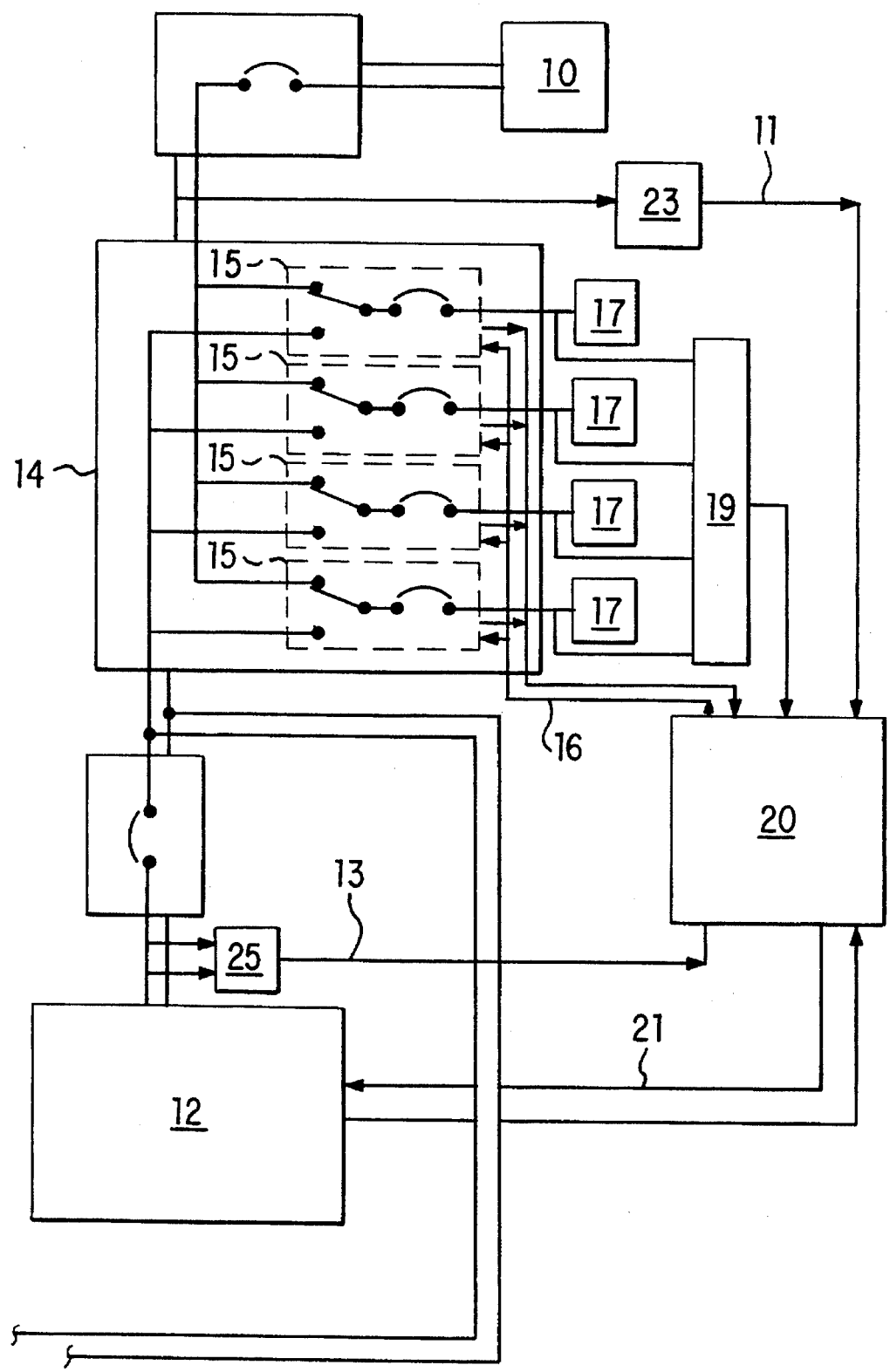
FIG. 2 is a simplified schematic diagram of the generator portion, of the system shown in FIG. 1, with a controller and various sensors.

One embodiment of a residential or commercial cogeneration system according to this invention is shown in simplified schematic and block diagram form in FIG. 1. As used throughout this specification and in the claims, the term "generator" is intended to be interchangeable with the terms "cogeneration system" "cogeneration source" and the like. Likewise, the term "electrical source" is intended to be interchangeable with the term "utility grid source" and the like. The portion of FIG. 1 showing utilization or dumping of heat derived from the generator and control of the thermal portion of the system is not important to this invention and may be performed in a number of ways apparent to one skilled in the art.

This invention is concerned with utilization of the maximum electrical output of the generator, and most particularly with solid state load switching of individual circuits between an electrical source, such as a utility power grid, and a generator electrical output. The switching system and method of this invention is particularly advantageous when switching occurs without paralleling the electrical source and the generator electrical output at any time. The electrical switching and the generator electrical production is controlled by control means, such as a computer or a microprocessor.

Each solid state load switch controls a separate service load circuit corresponding to selected circuit breaker in the residence, small commercial establishment or the like. The operation of each solid state load switch 15 is controlled by a separate controller which selects either the generator or another electrical source, for example, by utilizing a 0 to 5 volt DC signal from the computer or microprocessor. Transfer of the power is accomplished at the AC zero-voltage crossing with the transfer time being as fast as possible, preferably in the order of 8 to 16 microseconds, so as not to interrupt connected loads such as lights or digital clocks. The AC switch contacts are preferably of the break-before-make type to eliminate any chance of paralleling. Solid state load switches suitable for use in the system of this invention are known to those skilled in the art.

Microprocessor 20 according to one preferred embodiment of this invention, to provide desired control, receives a plurality of signals each indicating the amount of current flowing to one connected isolated circuit 17 of each solid state load switch 15. A load current signal in such embodiment has an approximate range of 0 to 5 volts DC analogous to approximately 0 to 30 amps for 120 volt AC switches. Microprocessor 20 can be programmed for critical load priorities so that if electrical source 10 fails and generator 12 is unable to supply all of the loads, the critical loads will be maintained while the non-critical loads will be shed.

According to one preferred embodiment of this invention, a method for switching a plurality of isolated circuits 17 between generator 12 and electrical source 10 includes sensing a load signal of each isolated circuit 17 and emitting each sensed load signal from sensing means 19 to microprocessor 20. A generator voltage output signal of generator 12 is also sensed and the sensed generator output signal 13 is emitted from sensing means 25 to microprocessor 20. Also, the available power signal of electrical source 10 is sensed and such sensed available power signal 11 is emitted from sensing means 23 to microprocessor 20.

Microprocessor 20 then computes, as a function of the sensed load signals, the sensed generator voltage output signal, and the sensed available power signal, whether each solid state load switch 15 should be individually switched to connect each isolated circuit to either generator 12 or electrical source 10. It is important to note that according to the system and method of this invention, no one isolated circuit 17 simultaneously receives power from both electrical source 10 and generator 12. Once microprocessor 20 computes which isolated circuits 17 should be applied to which source, either generator 12 or electrical source 10, microprocessor 20 emits a switching signal 16 to each solid state load switch 15. Each solid state load switch 15 is then energized to electrically connect each corresponding isolated circuit 17 to either generator 12 or electrical source 10.

It is apparent that multiple solid state load switches 15 can be grouped together and that microprocessor 20 can be used to control a plurality of individual solid state load switches 15, which is shown in the drawings as element reference numeral 14. According to one preferred embodiment of this invention, microprocessor 20 further comprises means for detecting faults of individual solid state load switches 15.

Microprocessor 20 can be used in various modes. In a manual mode, microprocessor 20 preferably initiates the switching of all isolated circuits 17 to electrical source 10, which allows operation of generator 12 independent from microprocessor 20.

In a standby mode, for example when a loss of utility power or power from electrical source 10 is detected, microprocessor 20 will prioritize, based upon preprogrammed prioritization information, and determine the order in which each isolated circuits 17 is switched to generator 12. Microprocessor 20 can then be used to adjust which isolated circuits 17 are connected to generator 12 and which are not present, so that the cogeneration system, or generator 12, can operate as close as possible to its maximum power rating, for example 5 KW. When the loss of power from electrical source 10 is detected, microprocessor 20 preferably emits a start-up signal 21 to start up generator 12.

Microprocessor 20 can also be used to operate the system in an electrical demand mode when the total current flowing through all solid state load switches 15 is greater than a predetermined base load value and the power from electrical source 10 is available. Thus, microprocessor 20 can be used to prevent operation of generator 12 when the load value which would be switched over to generator 12 is less than a certain power value, for example 2 KW. Once microprocessor 20 detects that generator 12 is operating, microprocessor 20 will emit signals 16 to each solid state load switch 15, for switching a preferred combination of isolated circuits 17 over to generator 12 until a maximum power rating of generator 12, for example 5 KW is utilized without exceeding such maximum power rating.

In one preferred embodiment according to this invention, microprocessor 20 can have pre-programmed operating mode priorities. For example, the operating modes can be ranked in order of priority, from highest to lowest, as follows: manual mode; standby mode; thermal demand mode; and electrical demand mode.

Each solid state load switch 15 preferably has an individual digital address which corresponds to the priority of each solid state load switch 15 during the standby mode of operation. In one preferred embodiment according to this invention, the particular status or conductive path of each solid state load switch 15, the connected source and fault conditions, and the amount of AC current flowing through each solid state load switch 15 is transmitted back to microprocessor 20 at certain intervals, such as once per second. During switching, if microprocessor 20 emits signal 16 for one particular solid state load switch 15 to connect to an unavailable source, either generator 12 or electrical source 10, for example due to a tripped circuit breaker, solid state load switch 15 will remain connected to the available source and can either remotely indicate a fault condition or emit a signal back to microprocessor 20 for indicating such fault condition.

Each solid state load switch 15 can be additionally protected against an overload or damage condition by appropriately sizing or designing the switch. Microprocessor 20 can also be programmed so that if communication is lost between microprocessor 20 and any one or more solid state load switches 15 and either an AC source becomes unavailable or a fault condition occurs, such solid state load switch 15 will be switched to or maintained on electrical source 10.

Microprocessor 20 preferably uses information from one or more solid state load switches 15 and local voltage sensing to determine if generator 12 is operating or should be started. Once generator 12 is operating, microprocessor 20 preferably switches the various solid state load switches 15 in a manner which depends upon the particular mode of operation of the system. Regardless of the mode of operation, overload conditions can be handled in a similar fashion. For example, if an overload value is exceeded for more than a defined period of time, or if the frequency of generator 12 falls below a specified value, microprocessor 20 can initiate the switching of loads from generator 12 to electrical source 10. In the demand mode of operation, certain isolated circuits 17 are shed or shifted from generator 12 to electrical source 10, whereas in the standby mode of operation, such isolated circuits 17 are turned off, preferably in reverse priority order for the standby mode. It is also apparent that in the demand mode, the switching order of isolated circuits 17 can be calculated as a function of a load optimizing algorithm which maximizes the load on generator 12.

In the demand mode, the loads of isolated circuits 17 are selected as a function of the amount of load existing on generator 12 and the amount of time one particular isolated circuit 17 has been stable. The load capacity of generator 12 can be divided into multiple levels wherein each level has associated with it a load stability time. The stability time associated with each level can control the amount of time microprocessor 20 waits before emitting a signal to switch the load of another isolated circuit 17 to generator 12, for example if generator 12 has a load which exceeds a certain current value.

Each solid state load switch 15 can have a stability time associated with it. If the current flowing through solid state load switch 15 shows stability over a certain period of time, then the load is considered stable and can be switched to generator 12. Preferably, as more load is added to generator 12, the stability time increases. Allowing additional time for the load to stabilize as the load upon generator 12 increases reduces the risk of generator 12 becoming overloaded due to cyclic loading.

Microprocessor 20, according to this invention, can monitor the loads of isolated circuits 17 as they change. Thus, microprocessor 20 can calculate when to add certain loads to generator 12 or when to shed certain loads from generator 12, so that generator 12 operates as close as possible to its maximum power, based upon a load criteria, depending upon how microprocessor 20 is programmed.

Load signals from isolated circuits 17 are preferably sensed continuously over time. Although the load signals are preferably determined from current values at each isolated circuit 17, it is apparent that voltage regulation or other suitable means for determining such load signals, as known to those skilled in the art, may be used.

A voltage regulator and electronic governor are used to control the generator output. Microprocessor 20 can be used to control the load connected to generator 20.

In another preferred embodiment according to this invention, the electrical generation system comprises a plurality of solid state load switches 15 which each form an electrical connection between a corresponding isolated circuit 17 and either the output of generator 12 or electrical source 10. Such system also comprises sensing means 19 for determining a load value of each isolated circuit 17. According to one preferred embodiment of this invention, sensing means 19, as well as sensing means 23 or 25, may comprise a current sensor and/or a voltage sensor or any other suitable device for determining electrical load requirements.

Control means are used to individually switch each solid state load switch 15 so that each isolated circuit 17 is independently switched between generator 12 and electrical source 10. Such individual switching can be calculated as a function of the determined load values and the generator capacity. The control means may further comprise microprocessor 20 or other computer means for: switching solid state load switches 17; prioritizing an order of switching of solid state load switches 17 when power from electrical source 10 is lost; optimizing which solid state load switches 15 should be switched to electrically connect corresponding isolated circuits 17 to generator 12 so that the output of generator 12 is as close as possible to the maximum power rating of generator 12; and determining whether generator 12 operates in a demand mode or in a standby mode.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

What is claimed is:

1. A method for switching a plurality of isolated circuits between a generator and an electrical source, the method comprising the steps of:
  (a) sensing a load signal of each of the isolated circuits and emitting the sensed load signals to a computer;
  (b) sensing an available generator power signal of the generator and emitting the sensed available generator power signal to the computer;
  (c) sensing an available source power signal of the electrical available source and emitting the sensed available power signal to the computer;
  (d) computing as a function of the sensed load signals, the sensed available generator power signal, and the sensed available source power signal whether each of a plurality of solid state load switches should be individually switched to connect each said isolated circuit to the generator or the electrical source; and
  (e) emitting a switching signal from the computer to each of the solid state load switches and switching each of the solid state load switches without paralleling when the electrical source is at zero-voltage crossover to electrically connect each of the corresponding isolated circuits to either the generator or the electrical source.

2. A method according to claim 1 wherein the sensed load signals are continuously sensed.

3. A method according to claim 1 wherein the sensed load signals are determined from current readings.

4. A method according to claim 1 further comprising prioritizing an order of switching of the solid state load switches when power from the electrical source is lost.

5. A method according to claim 1 wherein the computer optimizes which of the solid state load switches should be switched to electrically connect the corresponding isolated circuits to the generator so that the generator output operates as close as possible to a maximum power output rating of the generator.

6. A method according to claim 1 wherein the generator is operated in one of a demand mode where the electrical source provides power to at least one of the isolated circuits and a standby mode where the generator source provides all required power to all of the isolated circuits.

7. In an electrical generation system having a generator and an electrical source, and a plurality of isolated circuits each electrically fed from one of said generator and said electrical source, the improvement comprising:
  a plurality of solid state load switches each forming an electrical connection between a corresponding said isolated circuit and one of a generator output of said generator and said electrical source;
  sensing means for determining a load value of each of the isolated circuits;
  control means for individually switching each said solid state load switch without paralleling when said electrical source is at zero-voltage crossover so that each said isolated circuit is independently switched between said generator and said electrical source as a function of said determined load values, available power from said generator output, and a presence of power from said electrical source.

8. In an electrical generation system according to claim 7 wherein the sensing means continuously sense said load values.

9. In an electrical generation system according to claim 7 wherein said sensing means comprise current sensors for determining said load signals of each corresponding said isolated circuit.

10. In an electrical generation system according to claim 7 wherein said control means comprise computer means for prioritizing an order of the switching of said solid state switches when power from the electrical source is lost.

11. In an electrical generation system according to claim 7 further comprising computer means for optimizing which of said solid state load switches should be switched to electrically connect said corresponding isolated circuits to said generator so that a generator output is as close as possible to a maximum power output rating of said generator, 12. In an electrical generation system according to claim 7 wherein said control means comprise computer means for calculating whether said generator operates in a demand mode where said electrical source provides power to at least one of said isolated circuits or in a standby mode where said generator provides all required power to all of said isolated circuits,

* * * * *